Nov. 19, 1968   J. M. BIDDISON   3,411,725
COIL WINDING MACHINE
Filed July 12, 1965   2 Sheets-Sheet 1

INVENTOR.
JOHN M. BIDDISON
BY
HIS ATTORNEYS

Nov. 19, 1968

J. M. BIDDISON 3,411,725

COIL WINDING MACHINE

Filed July 12, 1965

INVENTOR.
JOHN M. BIDDISON

BY

Dybrig & Dybrig

HIS ATTORNEYS

United States Patent Office 3,411,725
Patented Nov. 19, 1968

3,411,725
COIL WINDING MACHINE
John M. Biddison, Dayton, Ohio, assignor to The Globe Tool and Engineering Company, Dayton, Ohio, a corporation of Ohio
Filed July 12, 1965, Ser. No. 471,239
13 Claims. (Cl. 242—1.1)

ABSTRACT OF THE DISCLOSURE

Four wire guide needles mounted on and for movement with a spindle reciprocated along and oscillated about an axis of a stator to form coils on pole pieces thereof are progressively moved by a cam radially toward and away from the aforementioned axis to lay wire evenly upon the pole pieces. The eccentricity of a cam engaging cam followers connected to the needles and snugly mounted upon the spindle is changed by holding the cam fixed as the spindle rotates during altrenate oscillatory movements of the spindle. In one embodiment, the aforementioned cam is a compound cam which can be adjusted to vary the extent of radial movement of the needles.

---

This invention relates to a winding machine and more particularly to winding machines for winding coils in generally radially inwardly directed coil receiving portions of stators or the like.

An object of this invention is to provide an improved winding machine for controllably changing the distribution of wire on coil receiving members.

A more specific object of this invention is to provide an improved winding machine for laying coils of wire evenly along generally radially directed coil receiving portions of stators or the like. In accordance with this invention, wire forming a coil upon a generally radially directed portion of a stator or the like is evenly laid by progressively moving a wire guide needle radially relative to such portion during the winding of the coil.

Other objects and advantages reside in the construction of parts, the combination thereof, the method of manufacture and the mode of operation, as will become more apparent from the following description.

Figures 1, 2, 3:
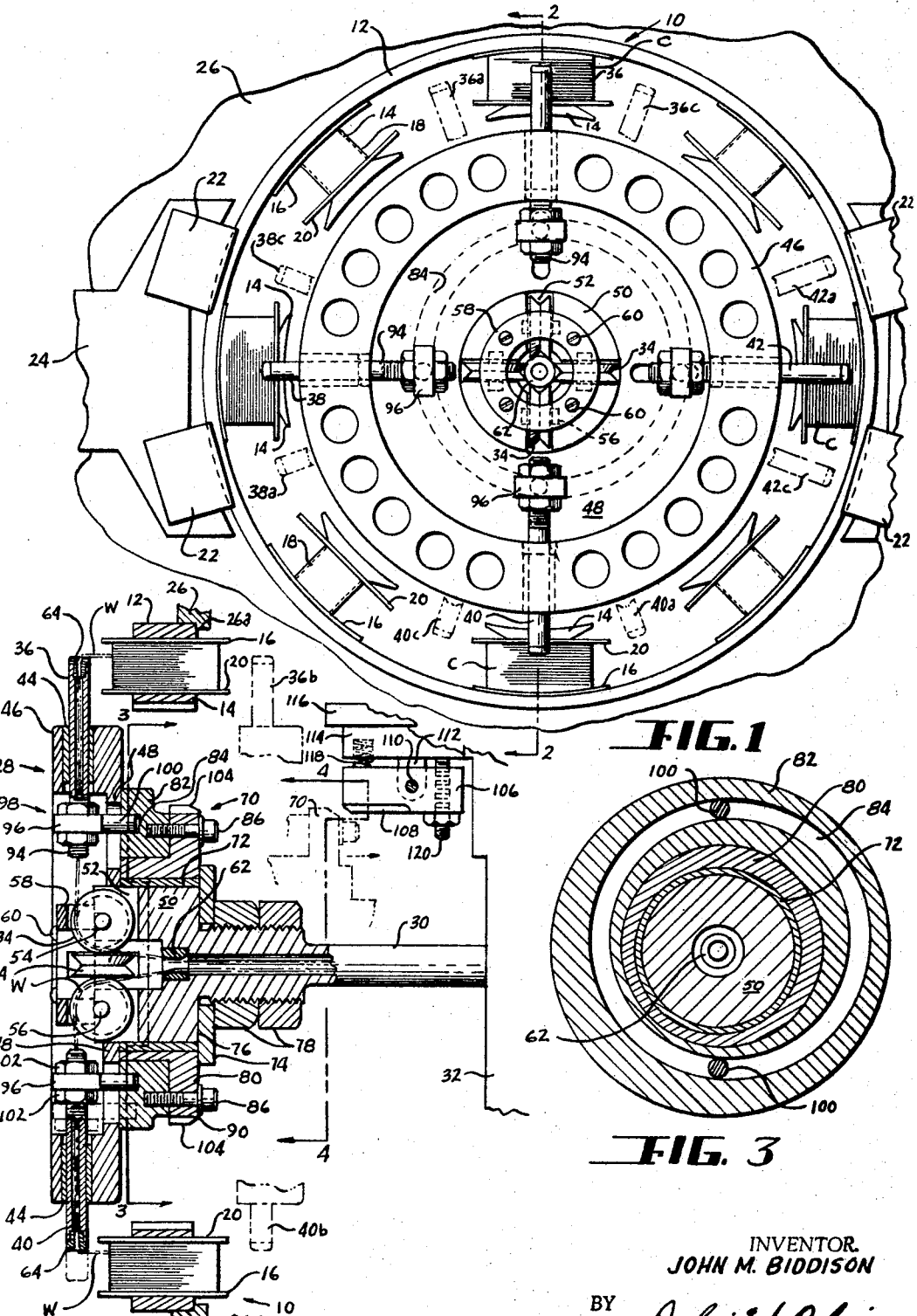
FIGURE 1 is a partial front elevational view of an improved winding machine made in accordance with this invention.
FIGURE 2 is a cross-sectional view taken along line 2—2 of FIGURE 1.
FIGURE 3 is a cross-sectional view taken along line 3—3 of FIGURE 2.

As will become more apparent below, this invention is directed to machines for laying coils on stators, such as the exciter stator generally designated 10 in FIGURE 1, having an annular, ring-shaped frame 12 provided with a plurality of integral pole pieces 14 having generally radially, inwardly extending coil receiving or forming surfaces. The coils loaded on the pole pieces 14 are insulated from the stator frame 12 by outer insulating plates 16, while insulating sleeves 18 and inner insulating plates 20 insulate the coils from the stator pole pieces 14. The specific stator shown in FIGURES 1 and 2 may serve as an exciter stator for an alternator or generator and is shown with eight pole pieces 14. It will be understood, however, that coils could be wound on a variety of coil receiving constructions by machines made in accordance with this invention.

A plurality of clamp pieces 22, shown in FIGURE 1, on clamp arms 24 releasably retain the stator 10 against an annular shoulder 26a (see FIGURE 2) surrounding an aperture in a winding machine mounting plate 26. The clamp arms 24 may either pivot or slide in and out to hold the stator 10 in place. The details of the mounting plate 26 and the clamp members 22 and 24 are not illustrated or described herein since such may take any convenient form.

As shown best in FIGURE 2, the stator 10, when clamped against the mounting plate 26, is in concentric, surrounding relation to a winding head or ram, generally designated 28, including a horizontally disposed, hollow, center shaft or spindle 30 projecting out of a winding machine drive housing 32. Incorporated in the housing 32 is a conventional reciprocatory and oscillatory drive mechanism connected to the spindle 30, the function of which will be described in greater detail below.

The wire strands, designated W, to be wound into coils on the pole pieces 14 pass through the central bore in the hollow spindle 30 around wire pulleys 34 and through central bores in wire guide needles 36, 38, 40 and 42. The needles 36, 38, 40 and 42 are slidably mounted within sleeves 44 located in radially extending apertures in a needle guide ring 46 which is also concentric with the annular shoulder 26a. The ring 46 may be connected to or integral with a guide ring support plate 48 which is welded at its center to the periphery of the enlarged outer end, designated 50, of the sipndle 30. Further mounting of the needles 36, 38, 40 and 42 will be described below.

The wire guide pulleys 34 are shown mounted for rotation on the outer end of the spindle 30 as follows. Four deep slots 52 providing clearance for the pulleys 34, are cut along crossed, perpendicular lines in the end face of the spindle 30. In addition, a shallow slot 54 is cut transversely of each slot 52. Each shallow slot 54 receives a small pulley shaft 56, each of which is fixed centrally of a pulley 34. The bottom face of a cylindrical pulley clamp member 58 affixed to the end face of the spindle 30, as by screws 60, and having slots cut therein to receive the pulleys 34, overlies the shallow slots 54 to retain the pulley shafts 56 therein. The outer, free end of the cylindrical member 58, shown to the left in FIGURE 2, overlies the pulleys 34 retaining the wire strands W thereon.

The mechanism thus far described is similar to some conventional mechanisms for winding coils on stator pole pieces. In operation, the drive mechanism (not shown) within the housing 32 rotates or oscillates the spindle 30 and, accordingly, the needle guide ring 46 first in a counterclockwise direction, as viewed in FIGURE 1, about the center axis of the shoulder 26a, which corresponds to the longitudinal axis of the spindle 30, whereupon the needles are moved to the position illustrated by the dotted lines 36a, 38a, 40a and 42a. The spindle 30 is then retracted along the aforementioned axis toward the housing 32, whereupon the various needles 36, 38, 40 and 42 pass between adjacent pole pieces 14 until the needles reach the position indicated by the dotted lines 36b and 40b in FIGURE 2. The shaft 30 is then rotated in the clockwise direction, as viewed in FIGURE 1, to complete one oscillation, whereupon the needles then occupy the position shown at 36c, 38c, 40c and 42c. The shaft 30 is then extended from the housing 32 to return the needles 36, 38, 40 and 42 to the position indicated in FIGURE 2 whereupon they are again rotated to the position designated 36a, 38a, 40a and 42a. Of course, the free ends of the wire strands W are initially tied down before the oscillatory and reciprocatory movement of the spindle 30 and the various needles is begun. The oscillating and reciprocating movement of the spindle 30, and hence the entire winding head 28 described above, is repeated until the wire strands W are wound upon the pole pieces to form the coils C illustrated in FIGURE 1.

In the preferred embodiment of FIGURES 1–4, there are four needles on the winding head 28 for simultaneously winding four coils. After completion of the winding of the first four coils, the winding head 28 and the stator frame 10 will be relatively rotated to position the needles for winding coils upon the empty pole pieces 14. Of course, the number of needles on the winding head 28 can be other than four. During the winding operation described above, the wire strands are drawn from a suitable wire supply and are kept under tension to avoid overrunning of the strands W at the ends of the reciprocatory and oscillatory motions of the spindle 30. A suitable supply and tensioning mechanism, along with a spindle drive mechanism, is illustrated in a patent application of Harry W. Moore, Ser. No. 230,097, filed in the United States Patent Office on Oct. 12, 1962, now United States Letters Patent No. 3,251,559 issued on May 17, 1966.

To avoid breakage, the wire strands W may pass along bearings, such as the bearing insert 62 located centrally within the bore of the end portion of the shaft 30 and bearing tips 64 mounted on the ends of the needles 36, 38, 40 and 42 having openings adjacent the coil forming surfaces of the pole pieces 14.

The needles in coil winding mechanisms of the type described above are ordinarily fixed relative to the spindle 30. While such machines usually are quite satisfactory, a problem arises when the stator pole pieces 14 are relatively closely spaced. The wire strands W tend to gather at the portion of the pole pieces immediately adjacent the ends of the needles, whereby undesirably large diameter coils are formed. Accordingly, the insulation surrounding the wire strands may be abraded as the needles pass between adjacent pole pieces, causing shorting of the wound coils. The uneven coil build-up may even be sufficient to interfere with the movement of the needles between the pole pieces. In accordance with this invention, even layering of the wire strands forming the coil windings is assured by progressively moving the needles 36, 38, 40 and 42 radially inwardly and outwardly relative to the central axis of the stator frame 12 along the coil receiving or forming surfaces of the pole pieces 14, during the winding operation. The mechanism for achieving this result will now be described.

Mounted on the spindle 30 immediately to the right of the guide ring support plate 48, as viewed in FIGURE 2, is a compound cam, generally designated 70, which may rotate on a bearing sleeve 72 encircling an intermediate portion of the spindle 30. The compound cam 70 is sandwiched between the rear face of the plate 48 and a washer 74 held flush against a shoulder portion 76 of the spindle 30, the rearward end of the sleeve 72 and the rear face of the compound cam 70 by means of a pair of lock nuts 78 threadedly engaged with a screw threaded portion of the spindle 30. With reference to FIGURES 2 and 3, the cam 70 includes an inner cam adjusting plate 80 and an outer cam track plate 82. The adjusting plate 80 has an eccentric aperture therein snugly receiving the sleeve 72. The cam track plate 82 has a groove or cam track 84 eccentric to an aperture therein snugly receiving the inner plate 80. As will be apparent to those skilled in the art, the eccentricity of the cam track 84 relative to the longitudinal axis of the spindle 30 may be varied by relative rotation of the cam plates 80 and 82. The two plates are normally held in fixed relation by locating pins 86 (FIGURES 2 and 4) passing through diametrically spaced arcuate slots 88 in a rearwardly located annular flange portion 90 of the cam adjusting plate 80 and threaded in apertures in the rear face of the cam track plate 82. It may be noted that the slots 88 extend somewhat in excess of 45° about the axis of the spindle 30. Therefore, to change the eccentricity of the cam track 84, the adjusting plate 80 may be rotated, upon removal of the pins 86, through an angle in excess of 45° from that position indicated in FIGURE 4. The pins 86 may also be removed from the apertures in the cam track plate 82 in which they are located in FIGURE 4 and the plate 82 reversed or the pins 86 may be threaded into apertures 92 in the cam track plate 82 which are spaced approximately 45° from the first mentioned apertures, whereupon a full 360° adjustment of the cam adjusting plate 80 relative to the cam track plate 82 is possible.

Figure 4:
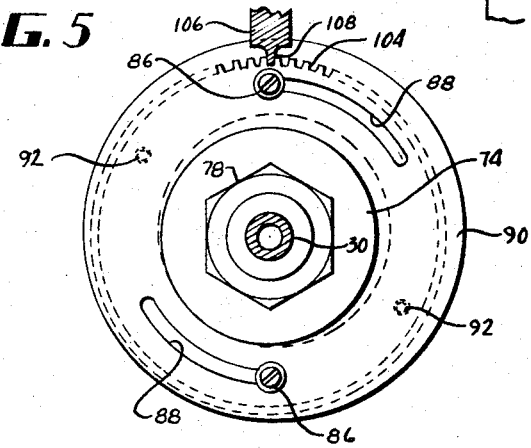
FIGURE 4 is a cross-sectional view including a rear elevational view of a portion of the mechanism shown in FIGURE 2, as viewed in the direction of arrows 4—4 of FIGURE 2.

The radially innermost ends of the needles 36, 38, 40 and 42 are threaded, as indicated at 94 in FIGURES 1 and 2, to receive eyelet portions 96 of cam followers, generally designated 98, which further include cam follower pin portions 100 that ride in the cam track 84. The eyelet portions 96 are sandwiched between retaining nuts 102 threadedly engaged with the various needles 36, 38, 40 and 42. The mounting of the compound cam 70 on the spindle 30 is sufficiently snug that the cam 70 ordinarily oscillates and reciprocates therewith. However, as the spindle 30 is rotated in a clockwise direction in its retracted position, means are provided for rotating the cam 70 relative to the spindle 30. As shown in FIGURES 2 and 4, the entire periphery of the flanged portion 90 of the adjusting plate 80 is provided with external gear teeth 104. A cam adjusting pawl 106, mounted on the housing 32 and having a depending tooth 108 adapted to engage between a pair of teeth 104, lies in the path of movement of the compound cam 70 upon retraction of the spindle 30, as illustrated by the arrow A and the phantom-line position of the cam 70 in FIGURE 2. As the spindle 30 is subsequently rotated in a clockwise direction, the cam 70 will be held fixed in relation to the housing 32. Hence, the spindle 30 rotates relative to the cam 70. Accordingly, the cam followers 98 are rotated relative to the cam track 84. It will be observed in FIGURE 2, for example, that the needle 36 extends radially outwardly such that its free end surrounding the opening through which the wire strand W passes is approaching one of the insulating plates 16, whereas the needle 40 is more nearly adjacent an insulated plate 20. Reference to FIGURE 1 also discloses that the free ends of the various needles are at different radial distances from the longitudinal axis of the spindle 30.

Since the cam 70 is rotated relative to the spindle 30 each time the spindle 30 is oscillated after being retracted toward the housing 32, the radial position of the various needles is changed upon each operating cycle of the spindle 30. Because the cam track 84 is continuous, each of the needles 36, 38, 40 and 42 are progressively moved radially inwardly and outwardly as each turn of the four coils C are being simultaneously wound, whereupon the wire strands W forming the coils C are laid evenly upon the pole pieces 14. Since the cam 70 is adjustable, various sizes of pole pieces and various diameters of wire can be accommodated. Further adjustment is possible in the location of the eyelet portions 96 of the cam followers 98 relative to the needles 36, 38, 40 and 42.

The cam adjusting pawl 106 is pivoted about a pawl pivot pin 110 affixed to a depending ear portion 112 of a support plate 114. The plate 114 may depend from a further support member 116 projecting from the drive housing 32. The free end of the pawl 106 is biased downwardly by a spring 118 against a stop formed by an adjusting screw 120, the upper end of which abuts the bottom face of the support 114. In the event that one of the teeth 104 should be misaligned with the tooth 108 as the cam 70 advances toward the housing 32, the pawl 106 cams upwardly against the bias of the spring 118. As soon as the spindle 30 begins to rotate in the clockwise direction, as viewed in FIGURE 1, the tooth 108 will be biased downwardly by the spring 118 into engagement between a pair of teeth 104. Accordingly, there will be no damage to the teeth 104 or the tooth 108 and also there will be considerable rotation of the cam 70 relative to the spindle 30.

Figure 5:
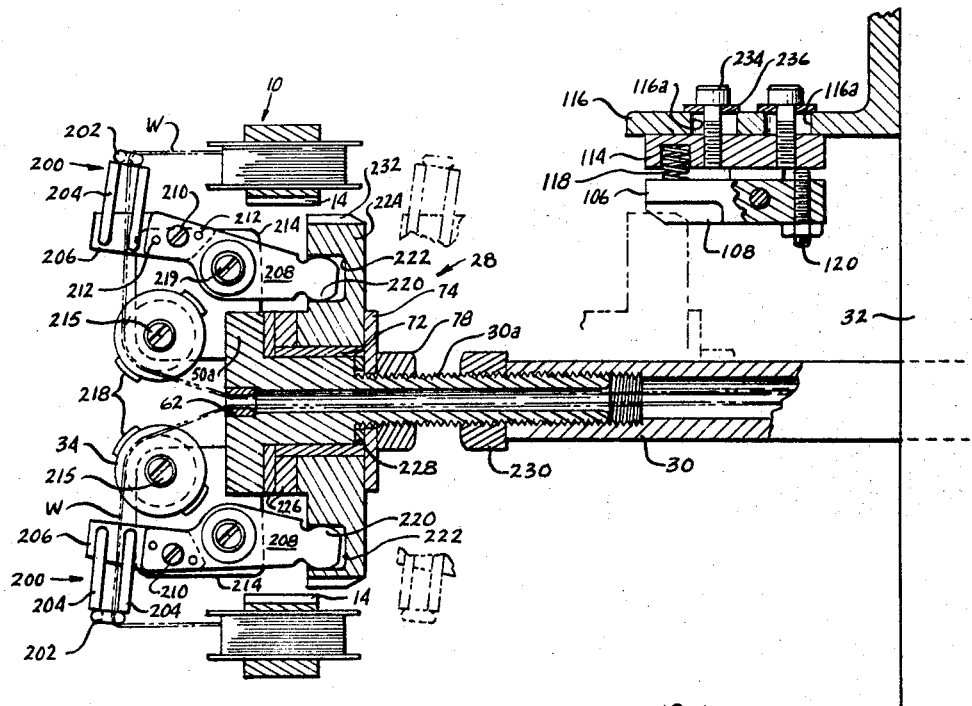
FIGURE 5 is a cross-sectional view, similar to FIGURE 2, of another embodiment of this invention.

FIGURE 5 discloses a simplified winding mechanism made in accordance with this invention employing only a simple cam member. In FIGURE 5, the parts identical or similar to those already described are labelled with the same reference characters. It may be noted in FIGURE 5 that a stator frame 10 is shown in surrounding concentric relation with a winding head 28 having a spindle 30 connected to drive mechanism (not shown) within a drive housing 32. In this case, for convenience in manufacturing, the spindle 30 is provided with a spindle or shaft extension 30a threaded within the central aperture therein. The extension 30a has an aperture extending longitudinally therethrough and a bearing insert 62 through which wire strands W are coursed around pulleys 34 through needles 200 which, in this case, comprise eyelets 202 affixed to the ends of support rods 204. The support rods 204 are mounted on support plates 206 forming part of cam followers 208 as by screws 210 and locating pins 212.

The pulleys 34 in this case are suported by pulley support plates 214 mounted on the enlarged end, designated 50a, of the shaft extension 30a. The pulleys 34 rotate about pivot pins or screws 215 affixed to the plates 214. To prevent the wire strands W from becoming disengaged from the pulleys 34, a generally U-shaped pulley shield 218 is affixed to each support plate 214 by the screws 215. The bights of the U-shaped pieces 218, since underneath the pulleys 34, cannot be seen in FIGURE 5.

The cam followers 208 are mounted for pivotal movement about an axis perpendicular to the longitudinal axis of the spindle 30 by pivot pins or screws 219 upon the support plates 214. The ends 220 of the cam followers 208 opposite that to which the needles are attached are rounded and ride within an eccentric cam track or groove 222 in a simple cam plate 224 mounted on a sleeve 72 which surrounds an intermediate portion of the shaft extension 30a. To maintain the axial position of the cam plate 224, it is clamped between spacers 226 which abut the rear face of the enlarged portion 50a and a washer 74 which abuts a ring-shaped spacer 228, the rear face of the sleeve 72, and the rear face of the cam plate 224. As in the embodiment previously described, the washer 74 may be held in position by a nut 78. The extension 30a and the elements mounted thereon are fixed in position relative to the spindle 30 by a similar nut 230. In the FIGURE 5 embodiment, the outer periphery of the cam plate 224 is provided with gear teeth 232 which serve the same function as the teeth 104.

The operation of the device shown in FIGURE 5 is substantially identical to that of the device shown in FIGURES 1 through 4. As the spindle 30 and its extension 30a retract toward the housing 32 whereupon the parts are in the position indicated by the phantom-lines, the tooth 108 of the pawl 106 engages between a pair of teeth 232. Upon subsequent rotation of the spindle 30, the plate 224 is held in position by the engagement of the teeth 232 and the tooth 108, whereupon the cam followers 208 are pivoted about the screws 219 to vary the radial position of the eyelets 202 relative to the pole pieces 14 of the stator 10.

In FIGURE 5, the pawl 106 is again shown suspended from the drive housing 32 by an ear 112 from a support plate 114 mounted upon a further support member 116 by screws 234. The screws 234 pass through large apertures 116a in the support member 116 to enable adjustment of the pawl 106 relative to the cam plate 224. Washers 236 overlie the apertures 116a to provide adequate support for the heads of the screws 234.

Since the device shown in FIGURE 5 operates essentially the same as the device shown in FIGURE 2, the same benefits are derived therefrom. However, the throw of the needles 200 in the FIGURE 5 device cannot be adjusted as can the throw of the needles 36, 38, 40 and 42 in the device shown in FIGURES 1 through 4. Of course, it will be understood that a compound cam, such as cam 70, could be used in association with pivotal cam followers, such as followers 208.

While the coil receiving or forming surfaces of the pole pieces 14 have been described as generally radially inwardly extending, it will be observed in FIGURES 1, 2 and 5 that these surfaces are not truly radial. The terminology "generally radial" or "substantially radial" are used herein are intended to refer to inwardly or the like used herein are intended to refer to inwardly directed radial or nearly radial surfaces capable of serving as forms upon which coils may be wound. It may also be noted in FIGURE 5 that, since the eyelets 202 pivot about the pivot pins or screws 219, the openings in the eyelets 202 through which the wire strands W pass do not move truly radially when the cam 224 is rotated relative to the longitudinal axis of the spindle 30. However, the movements of such openings are very nearly radial and are sufficient to cause the wire strands W to be wound upon spaced portions of the pole pieces 14.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a coil winding machine of the type having a winding head including at least one needle mounted on a spindle through which a wire strand to form a coil is coursed, and means for reciprocating and oscillating said spindle to move said needle about a coil receiving member upon which the coil is formed, the improvement comprising means progressively to change the radial position of the needle relative to said spindle as said needle is reciprocated and oscillated to evenly wind the wire upon said coil receiving member.

2. In a machine for winding coils of wire on generally radially inwardly directed pole pieces of a ring-shaped stator frame or the like, the combination comprising a reciprocating and oscillating spindle, means mounting a stator frame coaxially with said spindle, at least one wire guide needle, means mounting said needle upon said spindle for movement therewith, said needle having an opening through which wire strands forming a coil pass, said opening being adjacent a pole piece to receive a coil, and means intermittently and progressively moving said needle substantially radially relative to the axis of said spindle during movement of said spindle to evenly wind coi's of wire upon said pole piece.

3. In a machine for winding coils of wire into a coil receiving member having substantially radially inwardly directed coil forming surfaces, the combination of a reciprocating and oscillating spindle, a wire guide member carried by said spindle and moving therewith, said wire guide member having an opening through which a wire strand to form a coil passes, means for mounting a coil receiving member with said surfaces adjacent said opening whereby a coil of wire is wound over said surfaces as said spindle is rotated and oscillated, and means progressively moving said wire guide member substantially radially with respect to the axis of oscillation of said spindle to change the position of said opening relative to said coil forming surfaces during movement of said spindle to controllably change the distribution of wire upon said coil forming surfaces.

4. The structure of claim 3 wherein said means moving said wire guide member includes a cam mounted for rotation on said spindle, a cam follower connected to said wire guide member and following upon said cam, and means engaging and rotating said cam relative to said spindle during a portion of the movement of said spindle.

5. The structure of claim 4 wherein said wire guide member is slidably mounted along an axis radially extending from said spindle, and wherein movement of said cam follower upon rotation of said cam relative to said spindle causes said wire guide member to move along said radially extending axis.

6. In combination, a spindle mounted for reciprocating and oscillating movement along and about its longitudinal axis to wind a coil of wire on a receiving member, a wire guide member mounted on said spindle for movement therewith, a cam mounted on said spindle for movement therewith, a cam follower connected to said wire guide member and following upon said cam, and means engaging and moving said cam in timed relation to the movement of said spindle and relative to said spindle progressively to change the position of said wire guide member relative to said spindle to controllably change the distribution of wire upon said receiving member.

7. In a winding machine for winding coils of wire onto a coil receiving member having substantially radially inwardly directed coil forming surfaces, the combination of a reciprocating and oscillating spindle, a plurality of wire guide members carried by said spindle and moving therewith, each of said wire guide members having an opening through which a wire strand to form a coil passes, means for mounting a coil receiving member with a pair of said surfaces adjacent the opening of each of said wire guide members whereby a coil of wire is wound over each of said pair of said surfaces as said spindle is rotated and oscillated, and intermittently operable means simultaneously and progressively moving all of said wire guide members substantially radially with respect to the axis of oscillation of said spindle to change the position of said openings relative to said coil forming surfaces during movement of said spindle to controllably change the distribution of wire upon said coil forming surfaces.

8. In a coil winding machine of the type having a winding head including a plurality of needles mounted on a spindle through which wire strands to form coils are coursed, the spindle being reciprocated and oscillated to move said needles about coil receiving members upon which the coils are formed, the combination comprising a cam mounted on said spindle, a plurality of cam followers, one for each needle, connected to said needles and following upon said cam, and means intermittently rotating said cam relative to said spindle progressively to change the position of said cam followers and thereby said needles to controllably change the distribution of wire upon said coil receiving members.

9. In a machine for winding coils of wire on generally radially inwardly directed pole pieces of a ring-shaped stator frame or the like, the combination comprising a reciprocating and oscillating spindle, means mounting a stator frame coaxially with said spindle, at least one wire guide needle, means mounting said needle for sliding movement upon said spindle and for movement with said spindle, said needle having an opening through which wire strands forming a coil pass, said opening being adjacent a pole piece to receive a coil, and means intermittently moving said needle substantially radially relative to the axis of said spindle during movement of said spindle to evenly wind coils of wire upon said pole piece, said last mentioned means including a cam snugly mounted upon said spindle for movement therewith, means engaging said cam holding said cam in a fixed position during a portion of an oscillating movement of said spindle whereupon said spindle is rotated relative to said cam, said cam having an annular cam track formed thereon eccentric to the axis of rotation of said cam relative to said spindle, and a cam follower following upon said track and engaged with said needle.

10. The structure of claim 9 wherein said cam is a compound cam which may be adjusted to vary the radial movement of said needle.

11. In a machine for winding coils of wire on generally radially inwardly directed pole pieces of a ring-shaped stator frame or the like, the combination comprising a reciprocating and oscillating needle, means mounting a stator frame coaxially with said spindle, at least one wire guide needle, means mounting said needle for pivotal movement upon said spindle and for movement with said spindle, said needle having an opening through which wire strands forming a coil pass, said opening being adjacent a pole piece to receive a coil, and means intermittently moving said needle substantially radially relative to the axis of said spindle during movement of said spindle to evenly wind coils of wire upon said pole piece, said last mentioned means including a cam snugly mounted upon said spindle for movement therewith, means engaging said cam holding said cam in a fixed position during a portion of an oscillating movement of said spindle whereupon said spindle is rotated relative to said cam, said cam having an annular cam track formed thereon eccentric to the axis of rotation of said cam relative to said spindle and a cam follower following upon said track and engaged with said needle.

12. The structure of claim 11 wherein said cam is a compound cam which may be adjusted to vary the radial movement of said needle.

13. In a machine for winding coils of wire into a coil receiving member having substantially radially inwardly directed coil forming surfaces, the combination of a reciprocating and oscillating spindle, a wire guide member carried by said spindle and moving therewith, said wire guide member having an opening through which a wire strand to form a coil passes, means for mounting a coil receiving member with said surfaces adjacent said opening whereby a coil of wire is wound over said surfaces as said spindle is rotated and oscillated, said wire guide member being pivotally mounted upon said spindle about an axis perpendicular to the axis of oscillation of said spindle, and means moving said wire guide member substantially radially with respect to said axis of oscillation to change the position of said opening relative to said coil forming surfaces during movement of said spindle, said last mentioned means including a cam mounted for rotation on said spindle, a cam follower connected to said wire guide member and following upon said cam, and means engaging and rotating said cam relative to said spindle during a portion of the movement of said spindle, said movement of said cam follower upon rotation of said cam relative to said spindle causing said wire guide member to pivot about said perpendicular axis.

References Cited

UNITED STATES PATENTS

| | | | |
|---|---|---|---|
| 2,579,585 | 12/1951 | Klinksiek | 242—1.1 |
| 2,624,518 | 1/1953 | Scofield et al. | 242—1.1 |
| 3,082,966 | 3/1963 | Frederick | 242—1.1 |
| 3,099,409 | 7/1963 | Shaw | 242—1.1 |
| 3,106,351 | 10/1963 | Fulton | 242—9 |

BILLY S. TAYLOR, *Primary Examiner.*

UNITED STATES PATENT OFFICE
CERTIFICATE OF CORRECTION

Patent No. 3,411,725                          November 19, 1968

John M. Biddison

It is certified that error appears in the above identified patent and that said Letters Patent are hereby corrected as shown below:

Column 1, line 19, "altrenate" should read -- alternate --. Column 2, line 29, "sipndle" should read -- spindle --. Column 4, line 39, "insulated" should read -- insulating --. Column 8, line 10, "needle" should read -- spindle --.

Signed and sealed this 10th day of March 1970.

(SEAL)
Attest:

Edward M. Fletcher, Jr.                       WILLIAM E. SCHUYLER, JR.
Attesting Officer                             Commissioner of Patents